(12) United States Patent
Bai et al.

(10) Patent No.: US 9,420,115 B2
(45) Date of Patent: Aug. 16, 2016

(54) METHOD USING ARRAY MICROPHONE TO CANCEL ECHO

(71) Applicant: National Tsing Hua University, Hsinchu (TW)

(72) Inventors: Mingsian R. Bai, Hsinchu (TW); Yung-Chiang Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 177 days.

(21) Appl. No.: 14/061,282

(22) Filed: Oct. 23, 2013

(65) Prior Publication Data

US 2015/0043740 A1    Feb. 12, 2015

(30) Foreign Application Priority Data

Aug. 9, 2013  (TW) .............................. 102128619 A

(51) Int. Cl.

| | |
|---|---|
| *G10K 11/178* | (2006.01) |
| *H04R 3/00* | (2006.01) |
| *H04M 9/08* | (2006.01) |
| *G10L 21/0208* | (2013.01) |
| *H04R 3/02* | (2006.01) |

(52) U.S. Cl.
CPC ........... *H04M 9/082* (2013.01); *G10L 21/0208* (2013.01); *H04R 3/02* (2013.01); *H04R 3/005* (2013.01)

(58) Field of Classification Search
CPC .................................................. H04R 2430/25
See application file for complete search history.

(56) References Cited

U.S. PATENT DOCUMENTS

| | | | |
|---|---|---|---|
| 2005/0254347 A1* | 11/2005 | Beaucoup | 367/905 |
| 2009/0067642 A1* | 3/2009 | Buck et al. | 381/94.1 |
| 2011/0058676 A1* | 3/2011 | Visser | 381/17 |
| 2014/0056435 A1* | 2/2014 | Kjems et al. | 381/66 |

OTHER PUBLICATIONS

Breining, Christina et al., Acoustic Echo Control: An Application of Very-High-Order Adaptive Filters, IEEE Signal Processing Magazine, Jul. 1999, pp, 42-69, vol. 16.
Kobayashi, Kazunori et al., A Hands-Free Unit with Noise Reduction by Using Adaptive Beanformer, IEEE Transactions on Consumer Electronics, Feb. 2008, pp. 116-122, vol. 54, No. 1.
Griffiths, Lloyd J. et al., An Alternative Approach to Linearly Constrained Adaptive Beamforming, IEEE Transactions on Antennas and Propagation, Jan. 1982, pp. 27-34, vol. 30, No. 1.
Bai, M. at al., Acoustic Array Systems: Theory, Implementation, and Application, Wiley-IEEE Press, 2013, pp. 35-37.

* cited by examiner

*Primary Examiner* — Wayne Young
*Assistant Examiner* — Mark Fischer
(74) *Attorney, Agent, or Firm* — Muncy, Geissler, Olds & Lowe, P.C.

(57) ABSTRACT

A method using an may microphone to cancel echo applies to a sound receiving system and comprises steps: an array microphone receiving a sound source and outputting a plurality of analog acoustic signals formed from the sound source; an A/D converter converting the analog acoustic signals into a plurality of digital acoustic signals; a digital signal processor respectively using an adaptive beamforming process and a blocking matrix filtering process to convert the digital acoustic signals into a primary acoustic signal and at least one noise signal; and the digital signal processor using a multiple-input cancelling process to subtract the noise signal from the primary acoustic signal to obtain an acoustic signal where the echo has been cancelled. Thereby, the present invention can eliminate the systematic errors of the array microphone of the sound receiving system and improves the robustness of the acoustic signal.

7 Claims, 4 Drawing Sheets

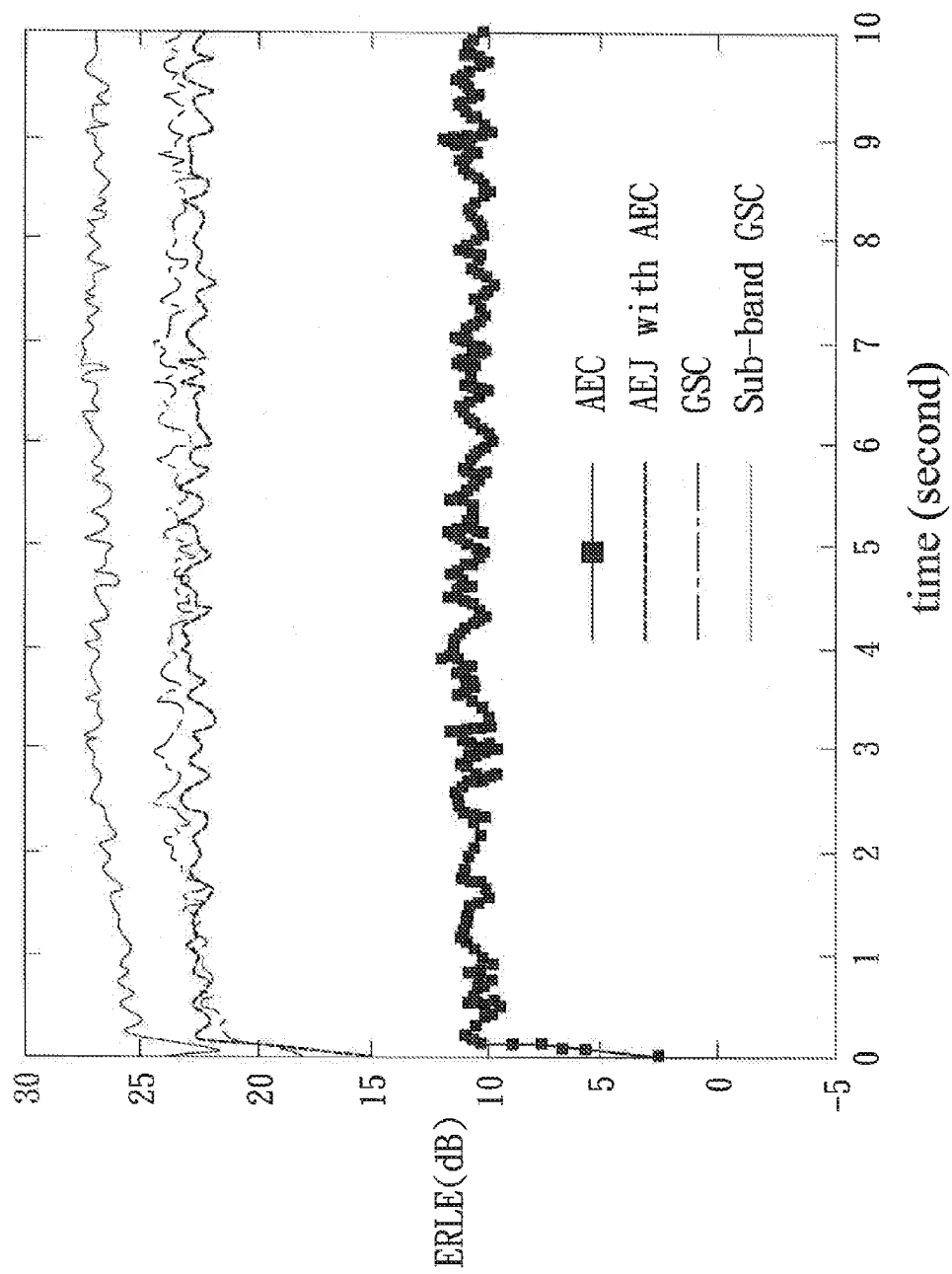

METHOD USING ARRAY MICROPHONE TO CANCEL ECHO

FIELD OF THE INVENTION

The present invention relates to a method for cancelling echo, particularly to a method using an array microphone to cancel echo.

BACKGROUND OF THE INVENTION

Many consumer electronics have long been troubled by acoustic echo. In an occasion where loudspeakers and microphones coexist, microphones would receive voices of near-end speakers, background noise, and acoustic echo generated by reflecting the sounds emitted by loudspeaker. All the abovementioned sounds are transmitted to a far-end communicator via a satellite. Thus, the far-end communicator would hear the sounds he has emitted before. Such a phenomenon will impair the ability of users to recognize voices.

The abovementioned problem is normally solved with an AEC (Acoustic Echo Cancellation) system. In "IEEE Signal Processing Magazine, Vol. 16, pp. 42-69 (1999)", C. Breining, P. Dreiscitel, E. Hansler, A. Mader, B. Nitsch, H. Puder, T. Schertler, G. Schmidt, and J. Tilp published a paper "Acoustic Echo Control. An Application of Very-High-Order Adaptive Filters", wherein an adaptive signal processing method is used to cancel acoustic echo and improve voice quality.

However, the adaptive algorithm used by the abovementioned ABC system is very complicated. Besides, the abovementioned AEC system only uses a single microphone to acquire signals. Thus, the echo cancellation effect thereof is limited.

In order to further improve the voice quality of communication, some in the field proposed an "AEJ with AEC (Array Echo Jammer with Acoustic Echo Canceller)" system. For example, Kazunori Kobayashi and Yoichi Haneda proposed "A Hands-Free Unit with Noise Reduction by Using Adaptive Beamformer" in IEEE Transactions on Consumer Electronics, Vol. 54, No. 1, pp. 116-122, February 2008, wherein sound signals are processed by a microphone array and then by an AEC system to achieve an effect of spatial filtering, whereby is inhibited or attenuated the echo transmitted via echo paths.

The following three systematic error factors would influence the performance and robustness of the microphone array technology: (i) the magnitude and phase response error among individual microphones; (ii) the position error between the intended location and the real acoustic center of the microphone; (iii) the pointing error caused by the signals transmitting via the paths deviating from the principal axis of the microphone array. With size reduction of microphones, the influence of the abovementioned factors grows stronger. Therefore, the microphone array-based echo cancellation technology still has room to improve.

SUMMARY OF THE INVENTION

The primary objective of the present invention is to solve the problem that the conventional "AEJ with AEC" system has inferior robustness.

To achieve the abovementioned objective, the present invention proposes a method using an array microphone to cancel echo, which applies to a sound receiving system to receive a sound source containing an echo. The sound receiving system includes an array microphone, an analog-to-digital (A/D) converter electrically connected with the array microphone, and a digital signal processor electrically connected with the A/D converter. The method of the present invention comprises steps:

the array microphone receiving the sound source and outputting a plurality of analog acoustic signals formed from the sound source;

the A/D converter converting the analog acoustic signals into a plurality of digital acoustic signals and outputting the digital acoustic signals;

the digital signal processor using an adaptive beamforming process to convert the digital acoustic signals into a primary acoustic signal with a directional sound receiving range;

the digital signal processor using a blocking matrix filtering process to filter the digital acoustic signals to obtain at least one noise signal which has a sound receiving range complementary to the directional sound receiving range; and the digital signal processor using a multiple-input cancelling process to subtract the noise signal from the primary acoustic signal to obtain an acoustic signal where the echo has been cancelled.

In summary, the present invention uses the adaptive beamforming process to acquire a signal component from the digital acoustic signals within the directional sound receiving range, uses the blocking matrix filtering process to acquire a noise component from the digital acoustic signals outside the directional sound receiving range, and uses the multiple-input cancelling process to cancel the noise component from the signal component to obtain the acoustic signal. Thereby is reduced the systematic errors of the array microphone and increased the robustness of the array microphone.

BRIEF DESCRIPTION OF THE DRAWINGS

FIG. 4 is a diagram comparing ERLE of the present invention and the conventional technologies.

DETAILED DESCRIPTION OF THE PREFERRED EMBODIMENTS

The technical contents of the present invention are described in detail in cooperation with the drawings below.

Figure 1:
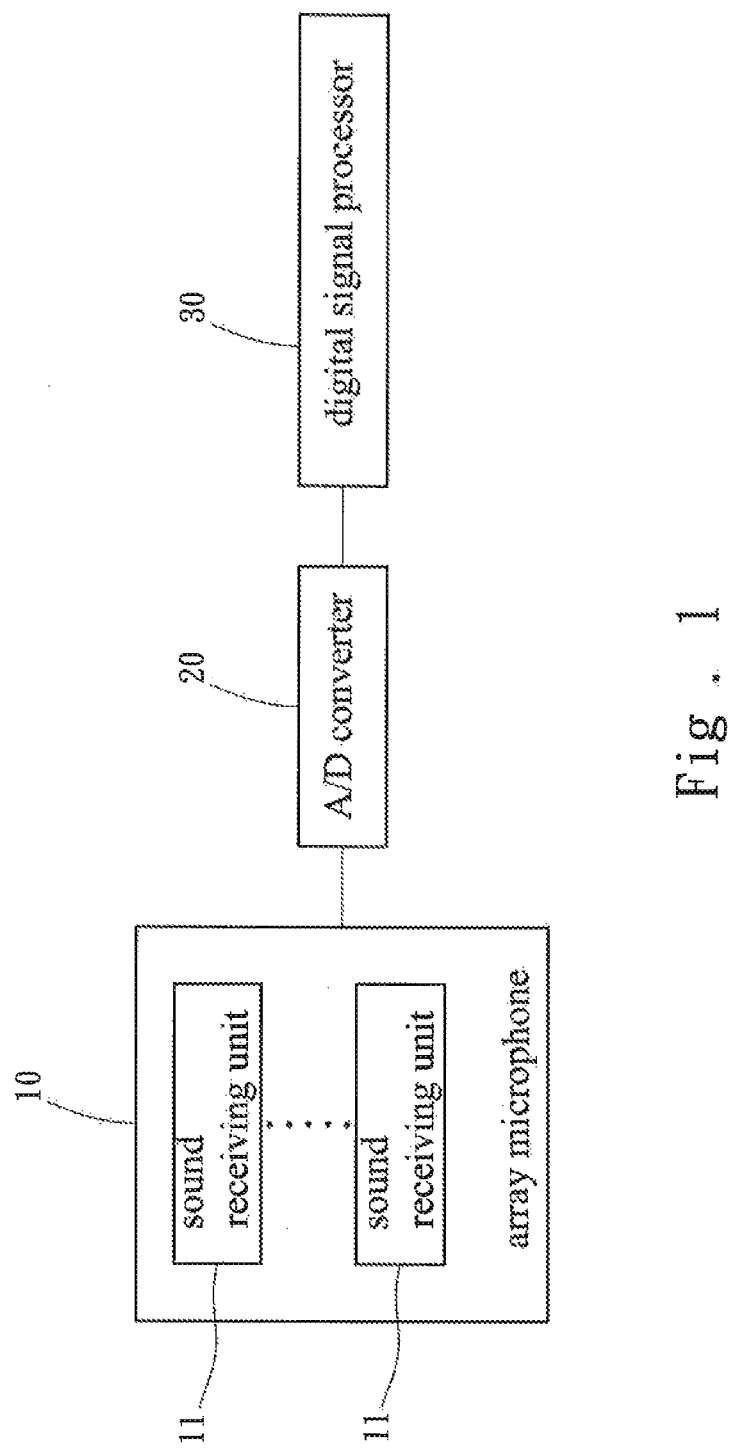
FIG. 1 is a diagram schematically showing a sound receiving system according to a first embodiment of the present invention.
Figure 2:
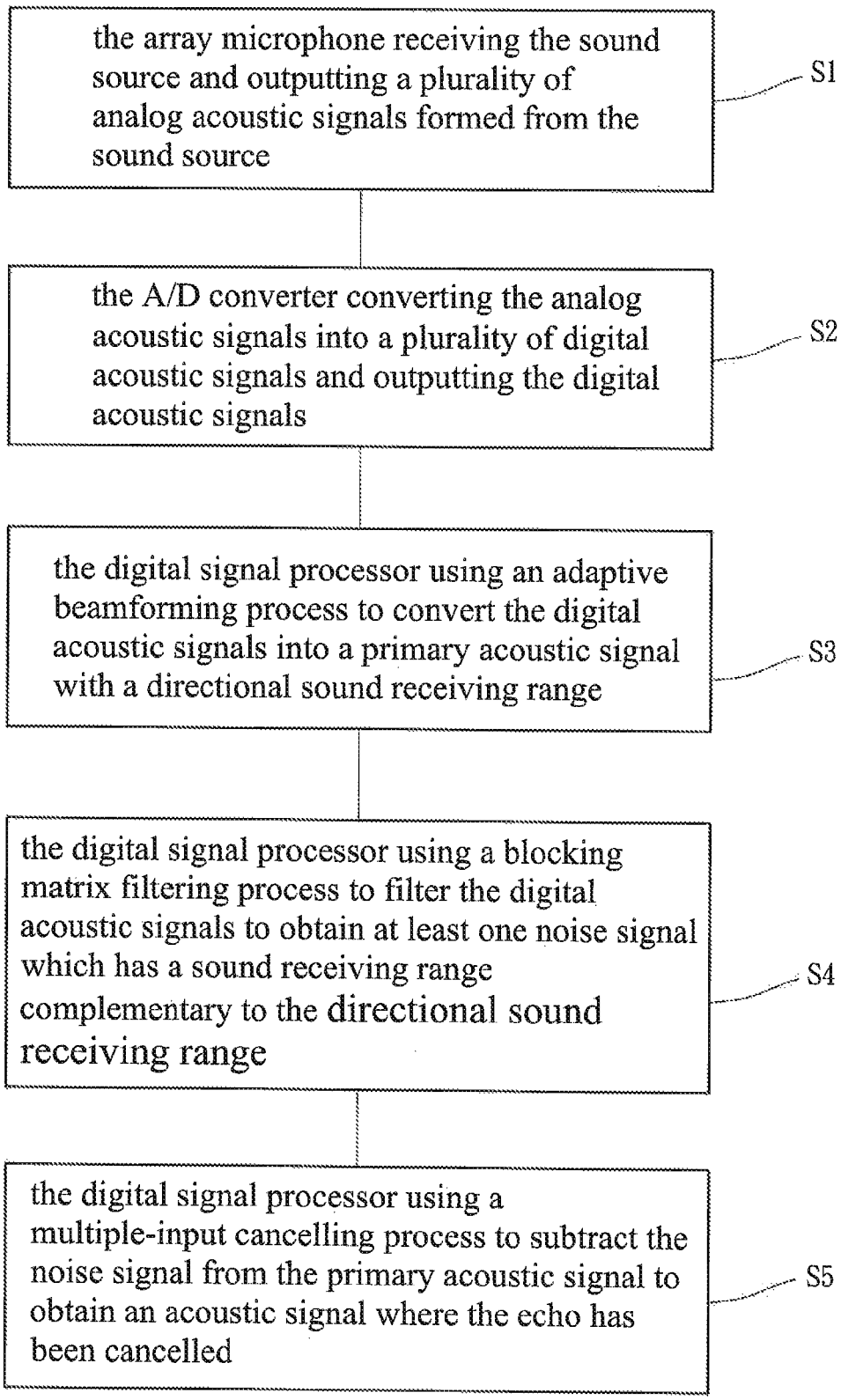
FIG. 2 is a flowchart of a method using an array microphone to cancel echo according to the first embodiment of the present invention.

Refer to FIG. 1 and FIG. 2. FIG. 1 is a diagram schematically showing a sound receiving system according to a first embodiment of the present invention. FIG. 2 is a flowchart of a method using an array microphone to cancel echo according to the first embodiment of the present invention. The present invention proposes a method using an array microphone to cancel echo, which applies to a sound receiving system to receive a sound source. Sounds are emitted by a loudspeaker and reflected by the environment to form an echo. The sound source includes the echo. The sound receiving system includes an array microphone 10, an analog-to-digital (A/D) converter 20, and a digital signal processor 30. The array microphone 10 further includes a plurality of sound receiving units 11. The sound receiving units 11 are arranged at different locations. In one embodiment, the sound receiving units 11 are MEMS (microelectromechanical system) microphones, which may be arranged by a small distance to form an array applicable to a handheld device. The A/D converter 20 is electrically connected with the array microphone 10, and the digital signal processor 30 is electrically connected with the A/D converter 20.

The method of the present invention comprises Steps S1-S5.

Step S1: Firstly, use the sound receiving units 11 of the array microphone 10 to receive the sound source. As the sound receiving units 11 are arranged at different locations, the array microphone 10 converts the sound source into a plurality of analog acoustic signals and outputs the analog acoustic signals to the A/D converter 20.

Step S2: The A/D converter 20 receives the analog acoustic signals, converts the analog acoustic signals into a plurality of digital acoustic signals and outputs the digital acoustic signals to the digital signal processor 30.

Step S3: The digital signal processor 30 uses an adaptive beamforming process to convert the digital acoustic signals into a primary acoustic signal with a directional sound receiving range. In the first embodiment, the adaptive beamforming process is performed by an LCMV (Linear Constraint Minimum Variance) method. The LCMV method is regarded as one part of the present invention and has been published by L. Griffiths and C. Jim in "An Alternative Approach to Linearly Constrained Adaptive Beamforming", IEEE Transaction Antennas and propagation, Vol. 30(1), pp. 27-34 (1982). In application of the LCMV method, the influences of WNG (White Noise Gain) and DI (Directivity Index) on the primary acoustic signal should be taken into consideration. While WNG grows higher, the primary acoustic signal within the directional sound receiving range becomes less sensitive to the inconsistency between it and the noise signal outside the directional sound receiving range. Thus, the directivity degrades. Therefore, WNG and DI should be balanced in application of the LCMV method. It should be noted that the directional sound receiving range is established according to the primary transmission path of the sound source to reduce the noise from the secondary transmission paths and achieve an effect of spatial filtering.

Step S4: The digital signal processor 30 uses a blocking matrix filtering process to filter the digital acoustic signals to obtain at least one noise signal which has a sound receiving range complementary to the directional sound receiving range. In the first embodiment, the blocking matrix filtering process is performed by an SVD (Singular Value Decomposition) method. The SVD method is regarded as one part of the present invention and has been published by M. R. Bai, J. G. Ih, and J. Benesty in "Acoustic Array Systems: Theory, Implementation, and Application" John-Wiley IEEE, pp. 35-37, 2013. The blocking matrix filtering process forms a zero-gain point in the primary transmission path of the sound source to block the reception of the sound source within the directional sound receiving range and obtain the noise signal from the sound source outside the directional sound receiving range by filtering. In the first embodiment, the number of the noise signals is equal to the number of the input digital acoustic signals. However, the present invention does not limit that the number of the noise signals must be equal to the number of the input digital acoustic signals.

Step S5: The digital signal processor 30 uses a multiple-input cancelling process to subtract the noise signal from the primary acoustic signal, whereby the noise signal is filtered out from the primary acoustic signal to obtain an acoustic signal where the echo has been cancelled. Besides, in the blocking matrix filtering process, the direction of the zero-gain point can be changed according to the position of the sound source. Thereby, the acoustic signal has a better quality.

Figure 3:
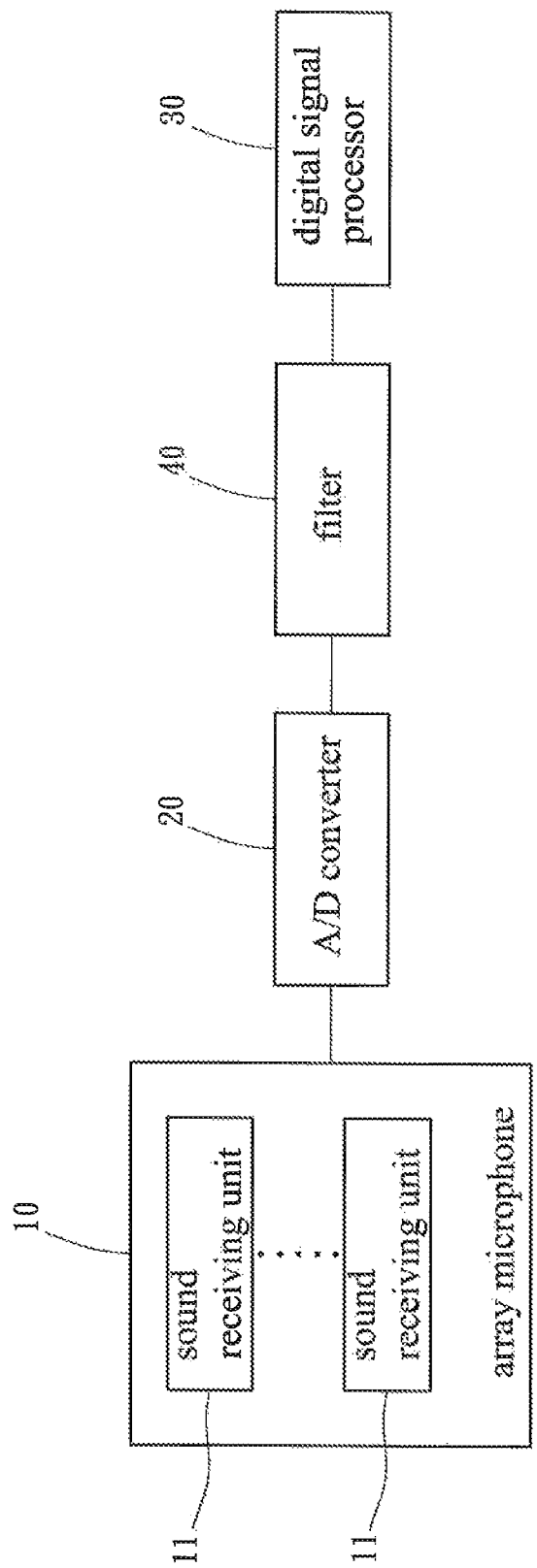
FIG. 3 is a diagram schematically showing a sound receiving system according to a second embodiment of the present invention.

Refer to FIG. 3 a diagram schematically showing a sound receiving system according to a second embodiment of the present invention. The second embodiment is different from the first embodiment in that the sound receiving system further includes a filter 40 to effectively reduce the operation loads in the abovementioned steps. The filter 40 is electrically connected with the A/D converter 20 and the digital signal processor 30.

The second embodiment is characterized in that the filter 40 performs a frequency-division sampling process on the digital acoustic signals after the A/D converter 20 converts the analog acoustic signals into the digital acoustic signals in Step S2. Thereby, the digital acoustic signals include a first-band digital acoustic signal and a second-band digital acoustic signal whose frequency band is different from that of the first-band digital acoustic signal, and whereby the digital acoustic signals have a lower sampling rate after frequency division. Then, the adaptive beamforming process, the blocking matrix filtering process, and the multiple-input cancelling process are undertaken successively.

Thus, in Step S3 of the second embodiment, the adaptive beamforming process makes the primary acoustic signal have a first-band primary acoustic signal whose frequency band is identical to that of the first-band digital acoustic signal and a second-band primary acoustic signal whose frequency band is identical to that of the second-band digital acoustic signal. In Step S4 of the second embodiment, the blocking matrix filtering process makes the noise signal have a first-band noise signal whose frequency band is identical to that of the first-band digital acoustic signal and a second-band noise signal whose frequency band is identical to that of the second-band digital acoustic signal. In Step S5 of the second embodiment, the multiple-input cancelling process subtracts the first-band noise signal from the first-band primary acoustic signal to obtain a first-band acoustic signal and subtracts the second-band noise signal from the second-band primary acoustic signal to obtain. a second-band acoustic signal. Then, the first-band acoustic signal and the second-band acoustic signal are restored to the original sampling rate and synthesized to obtain the acoustic signal.

Refer to FIG. 4 a diagram comparing ERLE (Echo Return Loss Enhancement) of the present invention and the conventional technologies, wherein the technologies of the first embodiment (GSC), the second embodiment (sub-band GSC), the conventional AEC system, and the conventional "AEJ with AEC" system are used to receive and record 10-second long acoustic signals inside an anechoic chamber with a model of a handheld device. The recorded acoustic signals are used to calculate ERLE. It is observed in FIG. 4: The maximum ERLE of the conventional AEC system is 10 db; the maximum ERLE of the conventional "AEJ with AEC" system is 22 db; the maximum ERLE of the first embodiment is 24 db; the maximum ERLE of the second embodiment is 27 db. Consequently the first embodiment of the present invention respectively outperforms the conventional AEC system and the conventional "AEJ with AEC" system by 14 db and 2 db; the second embodiment of the present invention respectively outperforms the conventional AEC system and the conventional "AEJ with AEC" system by 17 db and 5 db. Therefore, the present invention can improve the tolerance to systematic errors, increase the robustness of acoustic signal, and enhance the ability to cancel echo and noise. Further, the present invention can automatically move the zero-gain point of the array to the direction of noise transmission to reduce the noise.

In conclusion, the present invention uses the adaptive beamforming process, the blocking matrix filtering process and the multiple-input cancelling process to cancel the systematic errors of the array microphone of the sound receiving system and improve the robustness of the acoustic signal. Further, the present invention undertakes the abovementioned acoustic signal processing in a lower sampling rate, whereby operation load is effectively reduced. Furthermore, the present invention optimizes the related parameters according to the frequency band of the acoustic signal to effectively improve the processing effect.

What is claimed is:

1. A method using an array microphone to cancel echo, which applies to a sound receiving system that receives a sound source with an echo and includes an array microphone, an analog-to-digital (A/D) converter electrically connected with the array microphone, and a digital signal processor electrically connected with the analog-to-digital converter, comprising steps of:
   receiving the sound source and outputting a plurality of analog acoustic signals formed from the sound source by the array microphone;
   converting the analog acoustic signals into a plurality of digital acoustic signals and outputting the digital acoustic signals by the analog-to-digital converter;
   using an adaptive beamforming process to convert the digital acoustic signals into a primary acoustic signal with a directional sound receiving range by the digital signal processor;
   using a blocking matrix filtering process to filter the digital acoustic signals by the digital signal processor to obtain at least one noise signal which includes a sound receiving range outside of the directional sound receiving range; and
   using a multiple-input cancelling process to subtract the noise signal from the primary acoustic signal by the digital signal processor to obtain an acoustic signal where the echo has been cancelled.

2. The method according to claim 1, wherein the sound receiving system further includes a filter electrically connected with the analog-to-digital converter and the digital signal processor, and wherein after the analog-to-digital converter converts the analog acoustic signals into the digital acoustic signals, the filter performs a frequency-division sampling process on the digital acoustic signals to make the digital acoustic signals include a first-band digital acoustic signal and a second-band digital acoustic signal whose frequency band is different from that of the first-band digital acoustic signal, and then outputs the digital acoustic signals.

3. The method according to claim 2, wherein in the adaptive beamforming process, the primary acoustic signal has a first-band primary acoustic signal whose frequency band is identical to that of the first-band digital acoustic signal and a second-band primary acoustic signal whose frequency band is identical to that of the second-band digital acoustic signal.

4. The method according to claim 3, wherein in the blocking matrix filtering process, the noise signal has a first-band noise signal whose frequency band is identical to that of the first-band digital acoustic signal and a second-band noise signal whose frequency band is identical to that of the second-band digital acoustic signal.

5. The method according to claim 4, wherein in the multiple-input cancelling process, the digital signal processor subtracts the first-band noise signal from the first-band primary acoustic signal to obtain a first-band acoustic signal and subtracts the second-band noise signal from the second-band primary acoustic signal to obtain a second-band acoustic signal, and wherein the digital signal processor synthesizes the first-band acoustic signal and the second-band acoustic signal to obtain the acoustic signal.

6. The method according to claim 1, wherein the adaptive beamforming process is performed by a Linear Constraint Minimum Variance (LCMV) method.

7. The method according to claim 1, wherein the blocking matrix filtering process is performed by a Singular Value Decomposition (SVD) method.

* * * * *